(12) United States Patent
Shamir et al.

(10) Patent No.: US 9,268,095 B2
(45) Date of Patent: Feb. 23, 2016

(54) ALL-FIBER LOW MODE BEAM COMBINER FOR HIGH POWER AND HIGH BEAM QUALITY

(75) Inventors: Yariv Shamir, Kidron (IL); Yoav Sintov, Petach Tikva (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 39 days.

(21) Appl. No.: 13/520,368

(22) PCT Filed: Jan. 4, 2011

(86) PCT No.: PCT/US2011/020074
§ 371 (c)(1),
(2), (4) Date: Jul. 18, 2012

(87) PCT Pub. No.: WO2011/082411
PCT Pub. Date: Jul. 7, 2011

(65) Prior Publication Data
US 2012/0281948 A1    Nov. 8, 2012

Related U.S. Application Data

(60) Provisional application No. 61/291,968, filed on Jan. 4, 2010.

(51) Int. Cl.
*G02B 6/28* (2006.01)
*H01S 3/067* (2006.01)
*H01S 3/23* (2006.01)
*G02B 6/255* (2006.01)

(52) U.S. Cl.
CPC .......... *G02B 6/2835* (2013.01); *H01S 3/06708* (2013.01); *H01S 3/2383* (2013.01); *G02B 6/255* (2013.01)

(58) Field of Classification Search
CPC .................................. G02B 6/28; G02B 6/12
USPC ....................................................... 385/28, 29
See application file for complete search history.

(56) References Cited

U.S. PATENT DOCUMENTS

| | | | | |
|---|---|---|---|---|
| 5,295,211 | A | * | 3/1994 | Weidman ........................ 385/43 |
| 5,339,372 | A | * | 8/1994 | Miller et al. ...................... 385/29 |
| 5,664,037 | A | * | 9/1997 | Weidman ........................ 385/46 |
| 5,852,692 | A | * | 12/1998 | Nightingale et al. ........... 385/43 |
| 5,930,435 | A | * | 7/1999 | Laming et al. ................. 385/126 |
| 6,289,699 | B1 | * | 9/2001 | Kewitsch et al. ............... 65/406 |
| 6,546,170 | B1 | * | 4/2003 | Eyal et al. ....................... 385/43 |
| 7,272,956 | B1 | * | 9/2007 | Anikitchev et al. ............. 65/409 |

(Continued)

FOREIGN PATENT DOCUMENTS

| | | |
|---|---|---|
| CN | 2748933 | 12/2005 |
| EP | 2071376 | 6/2009 |

(Continued)

OTHER PUBLICATIONS

PCT Search Report PCT/US2011/020074.

*Primary Examiner* — Kaveh C Kianni
(74) *Attorney, Agent, or Firm* — Dekel Patent Ltd.; David Klein

(57) ABSTRACT

A low mode beam combiner (10) including individual entry fibers (12) that maintain a low mode operation, an exit fiber (16), and a spliced section (14) including a bundle of spliced entry fibers (12), in which a bundle diameter is reduced to a LMA (large mode area) core of the exit fiber (16).

7 Claims, 7 Drawing Sheets

(56) References Cited

U.S. PATENT DOCUMENTS

| | | | |
|---|---|---|---|
| 7,286,283 B2 * | 10/2007 | Starodoumov | 359/341.33 |
| 7,373,070 B2 * | 5/2008 | Wetter et al. | 385/134 |
| 7,409,128 B2 * | 8/2008 | Holcomb et al. | 385/115 |
| 8,160,415 B2 * | 4/2012 | Shkurikhin et al. | 385/115 |
| 8,472,765 B2 * | 6/2013 | Holland et al. | 385/43 |
| 8,514,485 B2 * | 8/2013 | Rothenberg | 359/341.1 |
| 2004/0101249 A1 * | 5/2004 | Tseng et al. | 385/50 |
| 2004/0196537 A1 * | 10/2004 | Starodoumov | 359/341.3 |
| 2005/0207455 A1 * | 9/2005 | MacCormack et al. | 372/6 |
| 2006/0187541 A1 * | 8/2006 | Starodoumov | 359/341.32 |
| 2007/0003196 A1 * | 1/2007 | Holcomb et al. | 385/115 |
| 2007/0206909 A1 * | 9/2007 | Wetter et al. | 385/92 |
| 2007/0230881 A1 * | 10/2007 | Tammela et al. | 385/115 |
| 2008/0193093 A1 * | 8/2008 | DiGiovanni et al. | 385/115 |
| 2009/0080469 A1 * | 3/2009 | Nikolajsen | 372/6 |
| 2010/0189138 A1 * | 7/2010 | Shkurikhin et al. | 372/6 |
| 2012/0262781 A1 * | 10/2012 | Price et al. | 359/341.3 |

FOREIGN PATENT DOCUMENTS

| | | | | |
|---|---|---|---|---|
| EP | 2071376 A1 * | 6/2009 | | G02B 6/28 |
| GB | 2238396 | 5/1991 | | |

* cited by examiner

After 8mm    10mm    11 mm

12mm    13mm    14mm and after 15mm

ALL-FIBER LOW MODE BEAM COMBINER FOR HIGH POWER AND HIGH BEAM QUALITY

CROSS-REFERENCE TO RELATED APPLICATIONS

This application is a national phase application of PCT patent application PCT/US11/020074, filed 4 Jan. 2011, which claims priority under 35 USC §119 to U.S. Provisional Patent Application, Ser. No. 61/291,968, filed 4 Jan., 2010, which are incorporated herein by reference.

FIELD OF THE INVENTION

The present invention generally relates to a novel approach to an all-fiber combining method of individual fiber lasers. The output power of the combining element is closely a sum of the fiber lasers power, and the beam quality is kept within the limit of the exit fiber parameters. Power levels are attained which cannot be achieved by a single fiber laser.

BACKGROUND OF THE INVENTION

A great effort has been made to enhance power extracted from fiber lasers. Recently, state of the art individual single mode (SM) fiber laser units have proven to be able to deliver up to 3 kW of power. A possible way to deliver higher power is by combining several fiber lasers. Generally, combining several fiber lasers results in outputs with high efficiency, but degraded laser beam quality; vice versa, in order to maintain a high beam quality of a combined beam, only a small amount of the power can be collected and thereby the combining efficiency is degraded.

Commonly available fused fiber combiners utilize multimode entry fibers and a deep multimode output fiber; thus, the major restriction is preventing light from radiating to the surrounding media. The combined structure is obtained by bundling, heating and pulling the individual source fibers together. An optional addition is to splice an output fiber with a mode capacity that can efficiently deliver the bundle output beam power while maintaining its beam quality. This addition may have some engineering benefits such as preferred thermal management and good structural behavior. The fused section is cleaved at a point where its diameter is equal to the inner core of the exit fiber. A connecting splice is done between the reduced bundle and the exit fiber's inner core. The propagating beam is bounded to the core only.

Various methods for combining fiber lasers have been suggested in the past. The principal methods and their limitations are described as follows:

1. Coherent fiber beam combining—in this technique, the temporal phases of the laser sources are matched. The method needs either a self-locking mechanism or a precise control system that corrects the phase mismatch of each individual laser. Until now, either small power was extracted, usually utilizing fiber laser interferometer setups, or medium to high power, in the order of several hundreds Watts with a complicated setup that is hard to implement in an industrial/field environment. Another approach is combining many diode lasers through fibers that are held in front of free space, partially reflecting mirrors, so a mutually phase locking is created between the sources by partial reflection. It has been reported that only a few of the sources are actually locked and there is extreme sensitivity to ambient conditions.

2. Incoherent fiber spectral beam combining: This method uses a highly dispersive element, usually a blazed Bragg grating, or photo-refractive Bragg grating. The individual lasers are designed to be wavelength-shifted from one another. The laser outputs are launched upon the dispersive element and are either reflected or refracted at different angles related to their wavelength. The method suffers from the needs of free-space optics setup, precise angular and translational positioning tolerances and very narrow line width of the sources wavelengths; otherwise the combined beams are not spatially overlapped, and the transfer efficiency of the refractive element decreases. Up to now the state of the art of combined power is approximately 500 W, while maintaining a good beam quality.

3. Direct fiber combining using a multimode fiber bundle and a deep multimode collection (exit) fiber: This technique combines the power of several fiber coupled diode lasers, for example by introducing a "fiber junction" where the beams are brought into close proximity by bundling and tapering the fibers using a hot flame and pulling machine. At a certain stage, the fused bundle is cleaved and attached to the final exit fiber. The exit fiber can contain the whole mixed beams since it is of a multimode type. The common application of this method is combining high power fiber-coupled laser diodes. The combined power levels have reached to the level of near 1 Kw with good power transfer efficiency. Although high power can be combined, the resulting beam quality is relatively low because of the deep multimode nature of the exit (collecting) fiber.

US Patent Application 20100189138 describes a high power fiber laser system that has a combiner including single mode (SM) fibers fused together that define an output end of the fiber combiner. The fused SM fibers radiate respective fiber outputs, which collectively define a multimode (MM) combiner output. The SM fibers each are configured with such optimally small numerical apertures (NA) that the MM combiner output is characterized by a minimally possible beam quality factor ($M^2$) for the plurality of SM fibers. To reduce the possibility of burning the components of the fiber laser system with a multi-kilowatt combiner output, a coreless termination block is fused to the output end of the fiber combiner and configured so as to provide expansion of the combiner output without modifying the minimally possible $M^2$ factor.

US Patent Application 20100189138 limits the combined lasers, which are coupled into each of the input ports, to be purely SM, due to the SM input fibers which are used. However, most high power fiber lasers are characterized by a non-SM output; typically the laser output $M^2$ is ~1.4, which cannot be coupled efficiently into a purely SM fiber (of which $M^2$ is <1.1). Accordingly, when coupling non-SM lasers to each of the SM inputs, a low coupling efficiency is achieved, which renders the device of US Patent Application 20100189138 to be sub-optimal in terms of efficiency and/or brightness.

SUMMARY OF THE INVENTION

The present invention seeks to provide an all fiber combiner for optimal performance both in terms of power delivery efficiency as well as beam quality conservation, as is described more in detail hereinbelow. In contrary to common combiners, the suggested combiner utilizes single mode entry fibers, and its output radiation beam quality is better than the number of input fibers time an ideal fiber beam quality. This puts a different restriction by which the mode coupling within the fused bundle is between the lowest modes only. The number of output modes therefore is also in the order of the number of input fibers. Thereby the beam quality is kept better than the output fiber maximum beam parameter product (geometrical approach by which the simple product $2NA_{[mR]}D_{[mm]}$ is considered as an upper limit for the beam parameter product).

In contrast with the prior art, the present invention describes a combiner having a plurality of few-mode input fibers, which are compatible with most high power lasers and an optimally designed MM output in terms of $M^2$ and power delivery efficiency. Since the input fibers are non SM, the combiner's optimization is markedly different from the prior art.

In order to analyze the optical performance of such a combiner, a thorough modal analysis is needed, contrary to the more simplified geometrical ray analysis commonly used in multimode combiners.

The following conditions (although the invention is not limited by them) are preferable to maintain good performance in terms of both combining efficiency as well as maintaining good beam quality:
1. The source fibers are of a single mode or very few mode types.
2. The down-tapering process is maintained adiabatic, so that negligible power is coupled from the input core modes to the higher order modes of the whole tapered fused bundle.
3. The exit fiber (optional addition) contains most of the power, yet has a limited number of modes, for a good quality output beam.

Another difference between the present invention and US Patent Application 20100189138 is now explained.

In US Patent Application 20100189138, paragraph [0017], it states: "The outer boundary of the combiner's output is formed as a result of heating and stretching of the SM fiber lasers whose outer boundaries of respective claddings gradually merge with one another to eventually define the outer boundary of the combiner output. Even if a single individual mode reaches the outer boundary of the combiner output, the quality of the fiber output radically deteriorates. Accordingly, the combiner output of the disclosed combiner owns its high quality to the preservation of the Gaussian shape of each individual SM fiber output having an optimally small NA and, thus, $M^2$ as well as an optimally large MFD which are attained in accordance with the disclosed process."

In further paragraphs, this is repeated:

[0020]: "However, the beam of the combiner's light output does not loose its high quality, since the single modes of respective SM fiber outputs unlikely reach the outer boundary of the block, which otherwise would lead to the increase of $M^2$ factor."

[0044]: "If the mode 38 reaches outer boundary 39, the SM fiber output looses its Gaussian beam shape, and the overall quality of the combiner output deteriorates."

[0045]: "Returning to FIG. 7, in order to avoid the coupling of any single mode into the boundary of the reduced combiner 24, the divergence angle (NA) of each individual SM fiber output and overall combiner output are continuously measured in step 32 by methods known to the artisan."

In contradistinction to this prior art, the present invention teaches and employs cross-fiber coupling. In creating the fused tapered section of the fibers, as the heat and pulling process advances, the individual fiber modes expand, and a cross-fiber-coupling mechanism occurs, enabled by the evanescent wave. This process ensures an optimal filling factor of the combined beam's area, and, assuming an adiabatic process, the output beam quality nearly obtains its highest achievable value.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
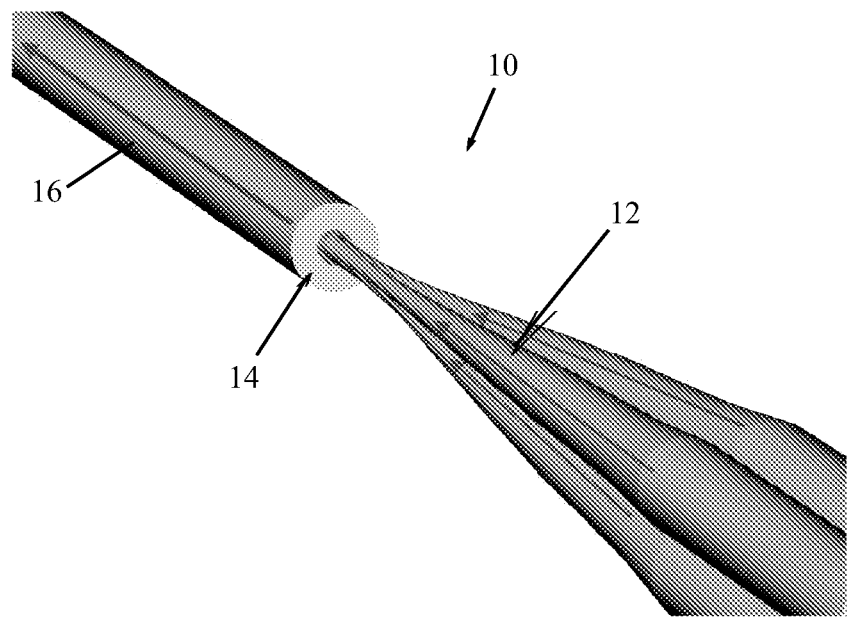
FIG. 1 is a simplified illustration of a low mode beam combiner, constructed and operative in accordance with an embodiment of the present invention.

Reference is now made to FIG. 1, which illustrates a low mode beam combiner 10, constructed and operative in accordance with an embodiment of the present invention.

Individual fiber lasers 12 enter the combiner 10, referred to as entry fibers 12. These fibers maintain a single or low mode operation. Combiner 10 has a spliced section 14, a bundle of spliced entry fibers 12, in which the bundle diameter is reduced to the LMA (large mode area) core of exit fiber 16.

Figure 2:
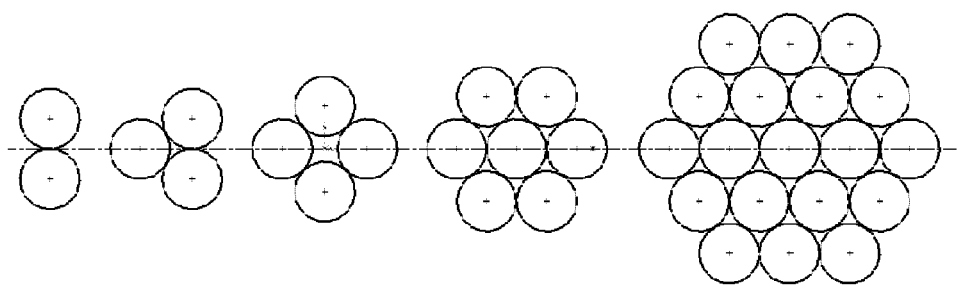
FIG. 2 is a simplified illustration of four optional fiber bundle configurations that may be used for a circular symmetry beam combiner, in increasing number order (the rightmost one has 19 fibers)

Reference is now made to FIG. 2. Since the fibers have a circular symmetry, one way of organizing them into a bundle is by packaging the fibers in circles. The natural numbers for such patterns are 2, 3, 4, 7, and 19 (although higher numbers are principally possible).

After positioning the fibers in such patterns, the fibers are gradually heated and pulled to a stage where their claddings are fused. The fused tapered section 14 (FIG. 1) is a common bundle of the previously independent fibers. The tapering process is adiabatic, that is, the low order modes are maintained and are not coupled to higher order modes.

As the heat and pulling process advances, the individual fiber modes expand, and a cross-fiber-coupling mechanism occurs, enabled by the evanescent wave. This process ensures an optimal filling factor of the combined beam's area, and since the tapering process is adiabatic, the output beam quality nearly obtains its highest achievable value.

As the common bundle is produced, it is cleaved such that the end face is flat in order to minimize light scattering. It is then an option to position this end in front of an exit fiber end face, centered in front of its core. This enables the confinement of most of the power into the exit fiber core modes, while maintaining a good beam quality. Finally, splicing of the two fibers is done.

Figure 3:
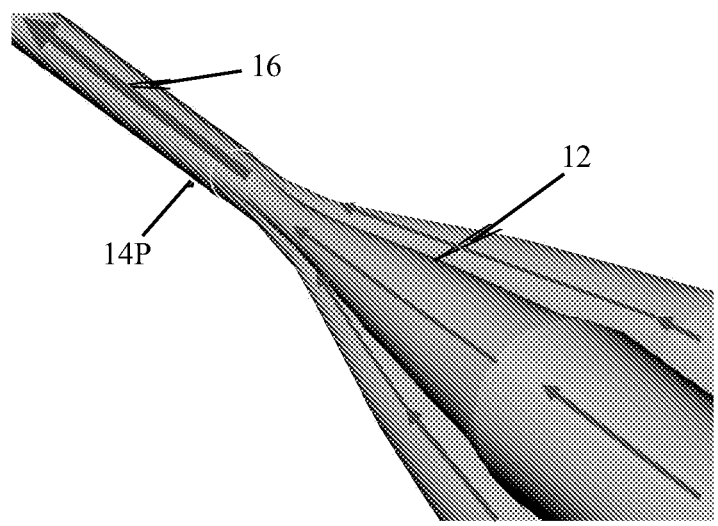
FIG. 3 is a simplified illustration of a typical multimode pump combiner, introducing low beam quality.

In contrast, a typical prior art multimode combiner is shown in FIG. 3. Multimode fused bundle combiners of the prior art are based on a spliced section 14P, in which the bundle is tapered to the whole core area of the target fiber, which excites a deep multimode beam output. The final tapered diameter is almost equal or is equal to is external diameter. Such a device can be easily analyzed via geometrical approach and is irrelevant to a good beam quality power delivery.

Figure 4:
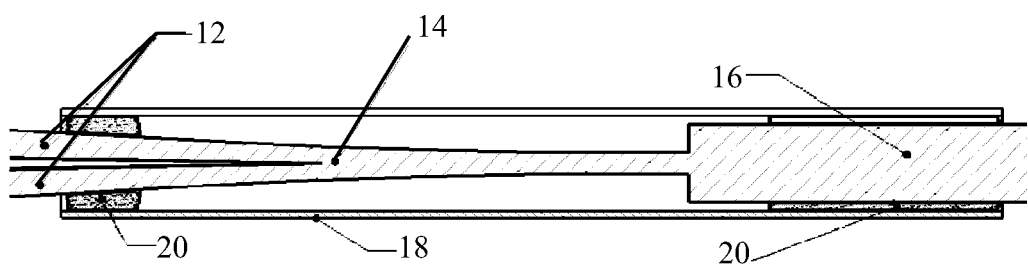
FIG. 4 is a simplified illustration of a robust design for supporting the fiber combining junction and supplying heat dissipation.

The splicing of the reduced diameter bundle to the exit large core fiber may severely suffer from mechanical bending stresses and reduced heat dissipation. This needs an appropriate strengthening and cooling without interfering with the optical power transfer. Furthermore, in multi kW power transfer, this junction is problematic in terms of thermal dissipation and optically induced damage. Therefore special packaging is required. A possible packaging is shown in FIG. 4.

The entry fibers 12 and exit fiber 16 are bonded to an inner surface of a supporting tube 18 with a thermal adhesive 20. The supporting tube 18 prevents the small size bundle (spliced section 14) from bending and breaking, while the thermal adhesive 20 directs and conducts the heat flux to the tube envelope. The adhesive 20 should not touch the bare tapered fiber in a zone where some of the mode's power has widened up to the vicinity of the cladding outer surface. This point is dictated by the following rule of a thumb: $V_{\#}=ak_0(n_1^2-n_2^2)^{1/2} \leq 1$, where $V_{\#}$, a, $k_0$ $n_1$ and $n_2$ stand for the fiber's normalized frequency, core radius, frees pace wave number, core and cladding refraction indices, respectively. The dimensions and materials of the tube and adhesive should be selected according to the required performance. For extreme power delivery it is advantageous to construct the tube from a highly conductive metal, like copper or even brass. For lower power, a silica tube may be sufficient.

Figure 5:
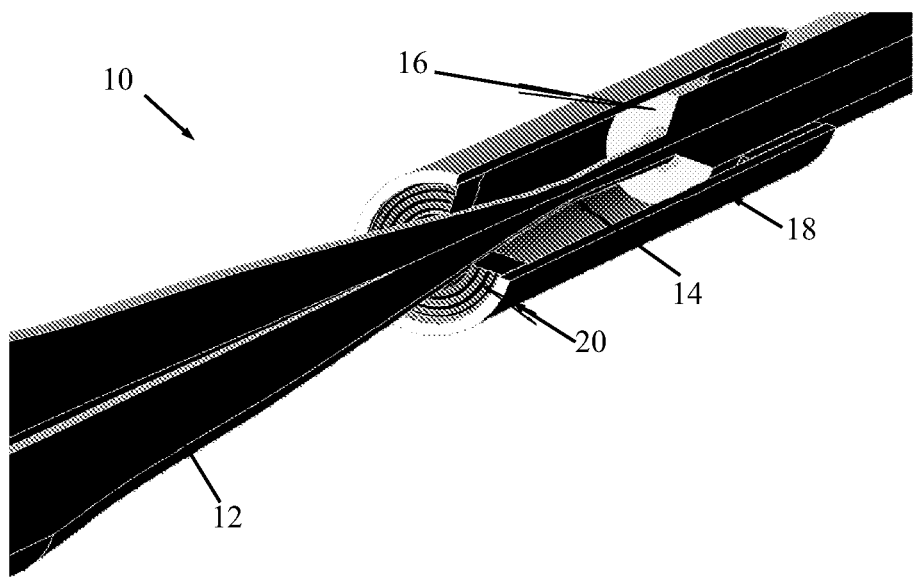
FIG. 5 is a simplified illustration of a 3D section of the previous structure, wherein the tube and adhesive are supporting the combiner.
Figure 6:
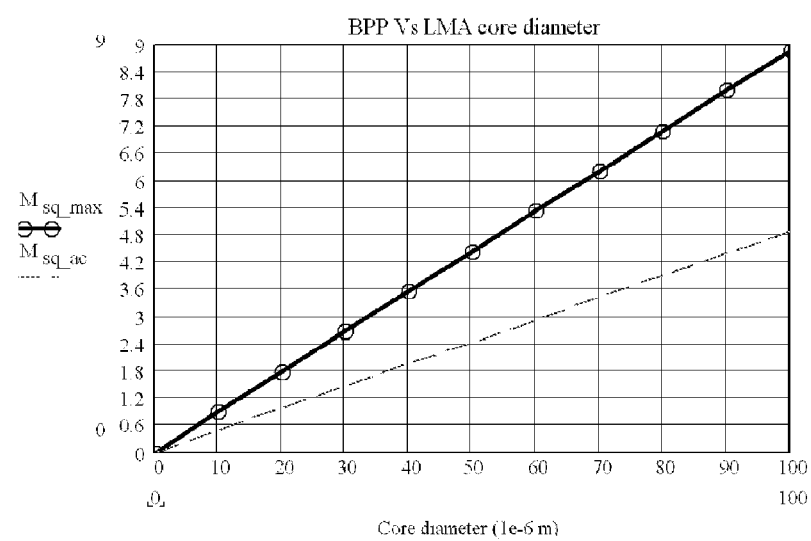
FIG. 6 is a simplified illustration of beam quality (the solid circles) that can be expected from LMA fiber with NA=0.06 and core diameter given in the horizontal axis, wherein the dashed line is a preliminary theoretical evaluation of what may be achieved if selected modes could be excited.
Figure 7:
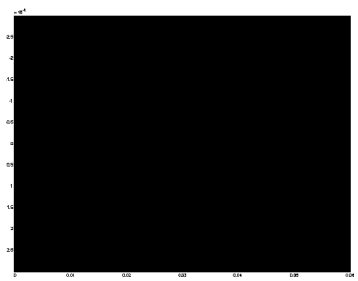
FIG. 7 is a simplified illustration of a 2D structure of a 2×1 LMA fiber combiner, wherein two fibers are gradually tapered and brought to close proximity, and wherein the right hand delivery fiber is twice as wide as the seeding fibers, and the passage junction is approximately 3.5 cm from the beginning, and wherein the exit fiber supports several modes, thereby delivering almost 100% of the power.
Figure 8:
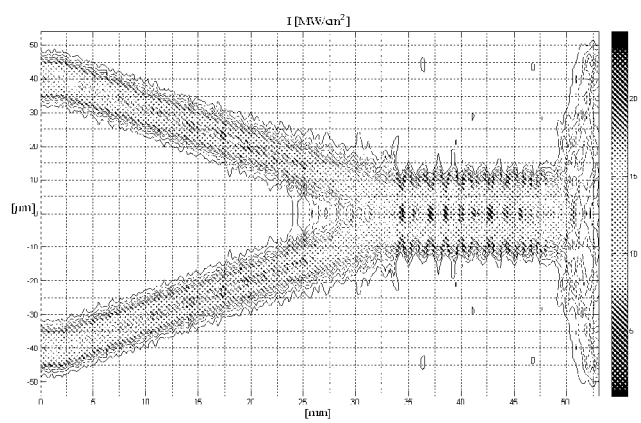
FIG. 8 is a simplified illustration of a beam propagation procedure, wherein the colors are proportional to the intensity envelope.
Figure 9:
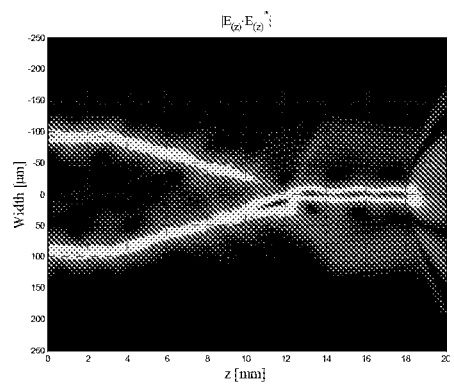
FIG. 9 is a simplified illustration of a 2D simulation of two separated fiber lasers done with FFT-BPM technique, wherein two fibers, separated by 90 µm, launch their power from left, and wherein the combining efficiency can be seen through the intensity increase after the exit core have been passed (12 mm from left)
Figures 10A, 10B:
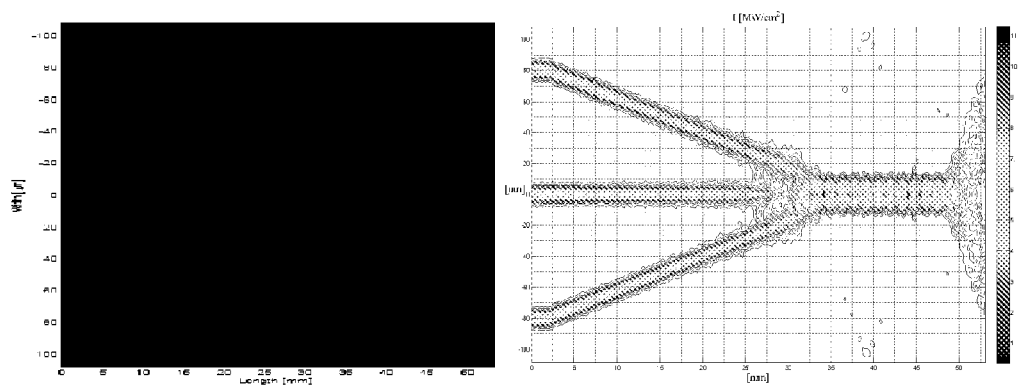
FIG. 10A is similar to FIG. 7, but with 3 combined fibers.
FIG. 10B is similar to FIG. 8, but with 3 combined fibers.
Figure 11:
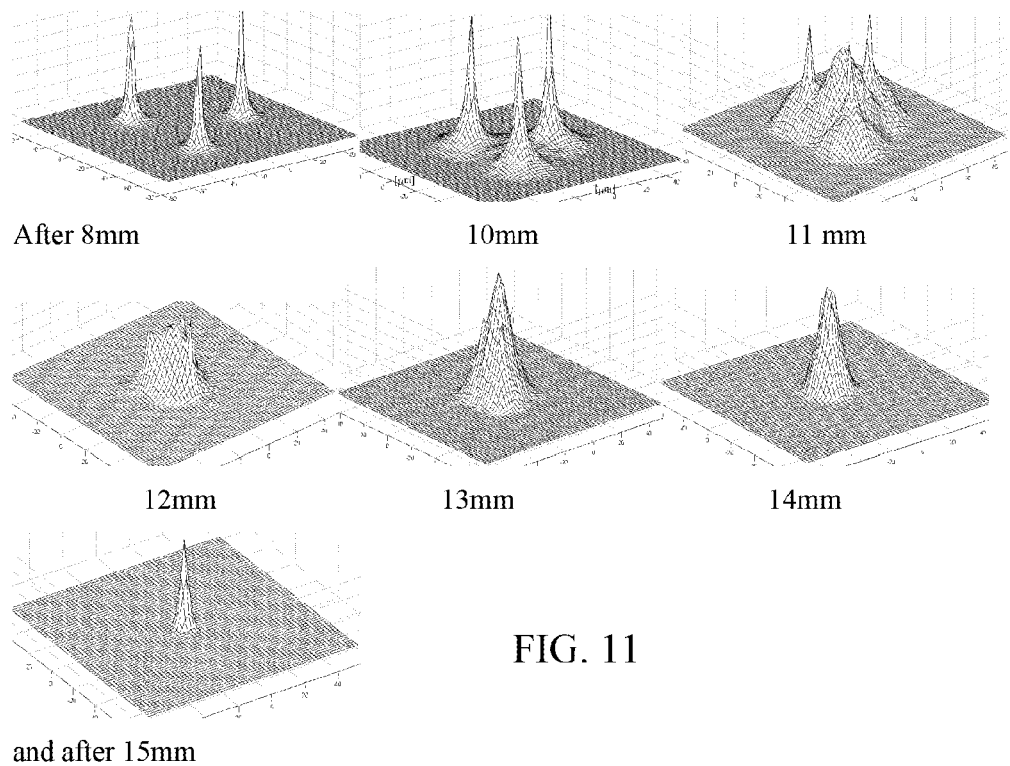
FIG. 11 is a simplified illustration of the gradual change in the mode intensity behavior along the tapered section and the coupling into the core.
Figure 12:
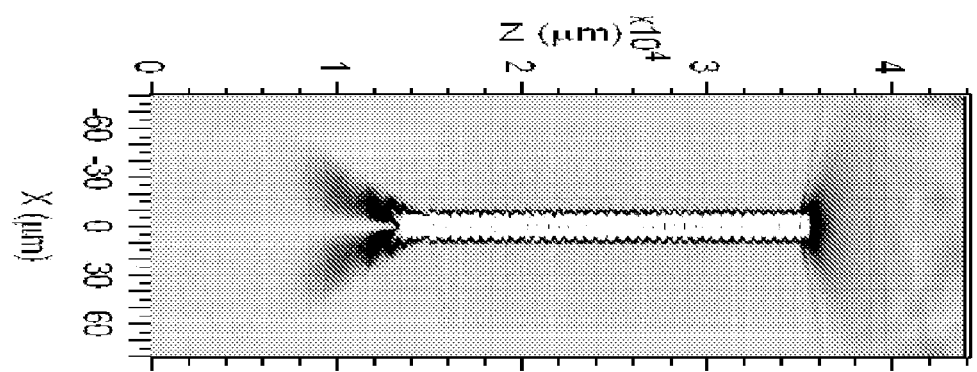
FIG. 12 is a simplified illustration of the whole process including the output fiber and diffraction to space.

As seen in FIG. 5, adhesive 20 maintains the tapered bundle 14 concentric with tube 18.

What is claimed is:

1. A method for making a low mode beam combiner comprising:
   providing individual entry fibers that maintain a low mode operation;
   providing an exit fiber; and
   splicing the individual entry fibers to form a spliced section comprising a bundle of spliced entry fibers having a bundle diameter, wherein said spliced section is formed by an adiabatic down-tapering process so as low order modes are maintained and are not coupled to higher order modes that comprises gradually heating and pulling said entry fibers so that claddings thereof are fused and the individual fiber modes expand to cause optical cross-fiber coupling; and
   bonding said entry fibers and said exit fiber to an inner surface of a supporting tube with a thermal adhesive, said thermal adhesive touching only a portion of said spliced section, and wherein said supporting tube prevents said spliced section from bending and breaking, and said thermal adhesive directs and conducts heat flux to said supporting tube.

2. The method according to claim 1, comprising reducing the bundle diameter to a LMA (large mode area) core of said exit fiber.

3. The method according to claim 1, wherein said entry fibers have a circular symmetry, and are bundled in patterns of circles.

4. The method according to claim 1, wherein low order modes of the entry fibers are maintained and are not coupled to higher order modes.

5. The method according to claim 1, wherein said thermal adhesive maintains said spliced section concentric with said tube.

6. The method according to claim 1, wherein said spliced section is cleaved to form a flat end face in order to minimize light scattering.

7. The method according to claim 1, wherein said thermal adhesive does not touch a bare tapered fiber at a zone where said fiber's normalized frequency is defined by: $V_{\#}=ak_0(n_1^2-n_2^2)^{1/2} \leq 1$, where $V_{\#}$, a, $k_0$ $n_1$ and $n_2$ stand for the fiber's normalized frequency, core radius, free space wave number, core and cladding refraction indices, respectively.

* * * * *